US012725033B2

(12) United States Patent
Atsmon et al.

(10) Patent No.: US 12,725,033 B2
(45) Date of Patent: Sep. 1, 2026

(54) GENERATING SIMULATED EDGE-CASE DRIVING SCENARIOS

(71) Applicant: Cognata Ltd., Rehovot (IL)

(72) Inventors: Dan Atsmon, Rehovot (IL); Ehud Spiegel, Petach-Tikva (IL)

(73) Assignee: Cognata Ltd., Rehovot (IL)

( * ) Notice: Subject to any disclaimer, the term of this patent is extended or adjusted under 35 U.S.C. 154(b) by 956 days.

(21) Appl. No.: 17/926,598

(22) PCT Filed: May 27, 2021

(86) PCT No.: PCT/IL2021/050629
§ 371 (c)(1),
(2) Date: Nov. 20, 2022

(87) PCT Pub. No.: WO2021/240528
PCT Pub. Date: Dec. 2, 2021

(65) Prior Publication Data

US 2023/0202511 A1 Jun. 29, 2023

Related U.S. Application Data

(60) Provisional application No. 63/030,359, filed on May 27, 2020.

(51) Int. Cl.

| | |
|---|---|
| ***B60W 60/00*** | (2020.01) |
| ***G06N 3/08*** | (2023.01) |
| ***G06V 20/58*** | (2022.01) |

(52) U.S. Cl.
CPC ............. *G06N 3/08* (2013.01); *B60W 60/001* (2020.02); *G06V 20/58* (2022.01); *B60W 2420/403* (2013.01); *B60W 2554/4049* (2020.02)

(58) Field of Classification Search
CPC ... G06K 9/00791; G06T 17/05; G06T 19/006; G05D 1/0221; G05D 1/0008;
(Continued)

(56) References Cited

U.S. PATENT DOCUMENTS 10,489,972 B2 11/2019 Atsmon
11,328,219 B2 * 5/2022 Zhang .................... G06N 20/00
(Continued)

FOREIGN PATENT DOCUMENTS

WO WO 2021/240528 12/2021

OTHER PUBLICATIONS

International Preliminary Report on Patentability Dated Dec. 8, 2022 From the International Bureau of WIPO Re. Application No. PCT/IL2021/050629. (14 Pages).
(Continued)

*Primary Examiner* — Andrew Joseph Rudy

(57) ABSTRACT

A system for generating simulated driving scenarios, comprising at least one hardware processor adapted for generating a plurality of simulated driving scenarios, each generated by providing a plurality of input driving objects to a machine learning model, where the machine learning model is trained using another machine learning model, trained to compute a classification indicative of a likelihood that a simulated driving scenario produced by the machine learning model comprises an interesting driving scenario.

19 Claims, 10 Drawing Sheets

(58) Field of Classification Search
CPC .......... G05D 1/0088; G05D 2201/0213; G06F 30/20; G01C 11/04; G01C 21/32; G01C 21/3815; G01C 21/3826
USPC ............................... 708/8; 382/154; 345/419
See application file for complete search history.

(56) References Cited

U.S. PATENT DOCUMENTS

| | | | |
|---|---|---|---|
| 11,475,677 | B2 * | 10/2022 | Avidan ................ G06F 18/2155 |
| 11,554,785 | B2 * | 1/2023 | Siddiqui .................. G08G 1/04 |
| 12,399,015 | B2 * | 8/2025 | Bojarski ................. G01S 19/41 |
| 2018/0203445 | A1 | 7/2018 | Micks et al. |
| 2018/0292824 | A1 | 10/2018 | Kazemi et al. |
| 2018/0364727 | A1 | 12/2018 | Huai |
| 2019/0129436 | A1 | 5/2019 | Sun et al. |
| 2019/0205667 | A1 | 7/2019 | Avidan et al. |
| 2019/0303759 | A1 | 10/2019 | Farabet et al. |
| 2020/0098172 | A1 | 3/2020 | Atsmon |
| 2025/0014276 | A1 * | 1/2025 | Atsmon ................. G01C 11/04 |

OTHER PUBLICATIONS

International Search Report and the Written Opinion Dated Sep. 27, 2021 From the International Searching Authority Re. Application No. PCT/IL2021/050629. (15 Pages).

Supplementary European Search Report and the European Search Opinion Dated May 29, 2024 From the European Patent Office Re. Application No. 21812049.1. (15 Pages).

Kuefler et al. “Imitating Driver Behavior with Generative Adversarial Networks”, 2017 IEEE Intelligent Vehicles Symposium (IV) Jun. 11-14, 2017, 202-211, Jul. 31, 2017.

* cited by examiner

400

401
Generate at least one simulated driving scenario

403
Provide the at least one simulated driving scenario to the other machine learning model 405
Modify at least one model value

GENERATING SIMULATED EDGE-CASE DRIVING SCENARIOS

RELATED APPLICATION/S

This application is a National Phase of PCT Patent Application No. PCT/IL2021/050629 having International filing date of May 27, 2021, which claims the benefit of priority under 35 USC § 119 (e) of U.S. Provisional Patent Application No. 63/030,359 filed on May 27, 2020. The contents of the above applications are all incorporated by reference as if fully set forth herein in their entirety.

FIELD AND BACKGROUND OF THE INVENTION

Some embodiments described in the present disclosure relate to simulated data and, more specifically, but not exclusively, to simulated driving scenarios.

As used herein, the term driving scenario refers to data describing a driving environment and one or more actors, acting in the driving environment. The driving environment may comprise a map describing a topology of a terrain, and one or more static objects of the driving environment, some examples being a paved road, a road mark, a sidewalk, a parked vehicle, a tree, a traffic sign, and a building. An actor is a moving object of the driving environment, for example a vehicle or a pedestrian. Another example is an animal. An actor may be acting in the air of the driving environment, for example a bird or a rock thrown by another actor of the driving environment. Another example is an object falling off of another object, for example an object falling off a building or an object falling off a moving vehicle.

In the field of autonomous driving, it is common practice for a system, for example an Autonomous Driving System (ADS) or an Advance Driver-Assistance System (ADAS), to include one or more machine learning models. Such machine learning models may serve as a system's corner-stone for learning how to function well on the road. It is common practice to use driving scenarios for training such machine learning models. Other uses of driving scenarios in the field of autonomous driving include validation of a machine learning model, verification of a machine learning model, and testing of a machine learning model. Driving scenarios may also be used for one or more of testing, validating, verifying, and training of a system, such as an ADS or an ADAS.

A driving scenario may be captured in a real physical driving scene, for example by one or more sensors mounted on a vehicle traversing the real physical driving scene. A driving scenario may be simulated. Optionally, part of a driving scenario is captured. Optionally, part of a driving scenario is simulated.

As used herein, the term "interesting driving scenario" is used to mean an unusual driving scenario, that is a driving scenario that is unlikely, i.e. relatively rare, but possible. An interesting driving scenario is sometimes known as an edge-case scenario. One example of an interesting driving scenario is a near-collision, for example when one vehicle moves quickly and closely to another vehicle. Other examples of an interesting driving scenario include an object on the road, unusual pedestrian behavior, unusual cyclist behavior, an abrupt stop of a vehicle (possibly followed by an unusual reaction by another vehicle), and an abrupt change in a vehicle's steering, for example when a vehicle abruptly steers towards a static object, for example a sidewalk or a building. Other examples of an interesting driving scenario include extreme weather conditions, some examples being fierce wind, a heavy downpour of rain, and a sudden bolt of lightning. When developing a system that responds to a driving scenario, for example an ADS or an ADAS, providing the system with interesting driving scenarios during training, testing, validation, verification and any combination thereof, increases robustness of the system. There is a need to generate interesting simulated driving scenarios.

SUMMARY OF THE INVENTION

It is an object of some embodiments described herein to provide a system and a method for generating simulated driving scenarios comprising one or more interesting driving scenarios.

The foregoing and other objects are achieved by the features of the independent claims. Further implementation forms are apparent from the dependent claims, the description and the figures.

According to an aspect of the disclosure, a system for generating simulated driving scenarios comprises at least one hardware processor adapted for: generating a plurality of simulated driving scenarios, each generated by providing a plurality of input driving objects to a machine learning model, where the machine learning model is trained using another machine learning model, trained to compute a classification indicative of a likelihood that a simulated driving scenario produced by the machine learning model comprises an interesting driving scenario. Using another machine learning model, trained to compute a classification indicative of a likelihood that a simulated driving scenario produced by the machine learning model comprises an interesting driving scenario, to train the machine learning model used for generating the plurality of simulated driving scenarios increases a likelihood that each of the plurality of simulated driving scenarios includes at least one interesting driving scenario.

According to another aspect of the disclosure, a method for generating simulated driving scenarios comprises: generating a plurality of simulated driving scenarios, each generated by providing a plurality of input driving objects to a machine learning model, where the machine learning model is trained using another machine learning model, trained to compute a classification indicative of a likelihood that a simulated driving scenario produced by the machine learning model comprises an interesting driving scenario.

According to another aspect of the disclosure, a system for training an autonomous driving model comprises at least one hardware processor adapted for in each of a plurality of iterations: computing a plurality of driving commands by providing the autonomous driving model with at least one simulated driving scenario generated by generating a plurality of simulated driving scenarios, each generated by providing a plurality of input driving objects to a machine learning model, where the machine learning model is trained using another machine learning model, trained to compute a classification indicative of a likelihood that a simulated driving scenario produced by the machine learning model comprises an interesting driving scenario; computing a score according to the plurality of driving commands and the at least one simulated driving scenario; and modifying at least one model value of the autonomous driving model to increase another score computed in a following iteration of the plurality of iterations. Training the autonomous driving model using one or more simulated driving scenarios generated by a machine learning model trained using another machine learning model trained to compute a classification indicative of a likelihood that a simulated driving scenario produced by the machine learning model comprises an interesting driving scenario increases a likelihood that the autonomous driving model is trained using one or more interesting driving scenarios, thus increasing accuracy of an output of the autonomous driving model in response to an input driving scenario.

In a possible implementation form of the first and second aspects, training the other machine learning model comprises using a plurality of recorded data sets, each recorded while a vehicle traverses a physical scene and comprises a recorded driving scenario and a plurality of recorded driving commands, the training is according to a difference between the plurality of recorded driving commands and a plurality of computed driving commands computed by the other machine learning model in response to the recorded driving scenario. Optionally, the machine learning model is trained using the other machine learning model by in each of a plurality of training iterations: generating, by the machine learning model, at least one simulated driving scenario in response to a plurality of training input driving objects; providing the at least one simulated driving scenario to the other machine learning model to compute at least one classification, indicative of a likelihood the at least one simulated driving scenario comprises at least one interesting driving scenario; and modifying at least one model value of the machine learning model, according to the at least one classification, to increase a likelihood of classifying another simulated driving scenario generated in a following training iteration as having at least one other interesting driving scenario. Training the other machine learning model using recorded data sets recorded while a vehicle traverses a physical scene increases accuracy of an output of the other machine learning model, and thus increases accuracy of the machine learning model generating the plurality of simulated driving scenarios. Optionally, the at least one interesting driving scenario comprises at least one of: a velocity value of a vehicle simulated by the other machine learning model, an acceleration value of the vehicle simulated by the other machine learning model, a driving command generated by the other machine learning model, an orientation value of the vehicle simulated by the other machine learning model, and a distance between the vehicle simulated by the other machine learning model and at least one other object of the driving scenario.

In another possible implementation form of the first and second aspects, the at least one hardware processor is further adapted for providing at least some of the plurality of simulated driving scenarios to at least one autonomous driving model for the purpose of at least one of: training the at least one autonomous driving model, testing the at least one autonomous driving model, verifying the at least one autonomous driving model, and validating the at least one autonomous driving model. Optionally, the at least one autonomous driving system is at least part of a system selected from a group consisting of: an autonomous driving system (ADS), and an advanced driver-assistance system (ADAS).

In another possible implementation form of the first and second aspects, the plurality of input driving objects comprises at least one of: a moving object of a simulated driving environment, and a static object of a simulated driving environment. Optionally, the moving object is selected from a group of moving objects consisting of: a vehicle, and a person. Providing the machine learning model with one or more of a moving object of a simulated driving environment and additionally or alternatively one or more static objects of a simulated driving environment increases accuracy of a simulated driving environment generated by the machine learning model.

In another possible implementation form of the first and second aspects, for generating at least one of the plurality of simulated driving scenarios the machine learning model is further provided with a map describing a topography of a simulated driving environment. Providing the machine learning model with a map describing a topography of a simulated driving environment increases accuracy of a simulated driving environment generated by the machine learning model.

In another possible implementation form of the first and second aspects, the plurality of input driving objects comprises at least one object generated by a random object generator. Providing the machine learning model with one or more objects generated by a random object generator increases a diversity between the plurality of generated scenarios, increasing a likelihood that the plurality of generated scenarios comprises at least one interesting driving scenario.

In another possible implementation form of the first and second aspects, the machine learning model is further provided with a plurality of constraints, and the machine learning model generates at least one of the plurality of simulated driving scenarios according to the plurality of constraints. Using the plurality of constraints to generate a simulated driving scenario increase accuracy of the generated simulated driving scenario.

In another possible implementation form of the first and second aspects, at least one of the plurality of simulated driving scenarios comprises a plurality of movement vectors of a plurality of simulated objects of a simulated driving environment.

In another possible implementation form of the first and second aspects, generating at least one generated scenario of the plurality of simulated driving scenarios further comprises applying at least one environment-characteristic adjustment to the at least one generated scenario. Applying one or more environment-characteristic adjustments to a generated scenario increase accuracy of the generated scenario.

In another possible implementation form of the first and second aspects, the machine learning model is a generator network of a Generative Adversarial Neural Network (GAN) or of a Conditional Generative Adversarial Neural Network (cGAN). Optionally, the other machine learning model is a neural network. Optionally, the neural network is trained using an imitation learning method. Using a generator of a GAN or of a cGAN to generate the plurality of simulated driving scenarios, and additionally or alternatively using one or more neural networks to train the machine learning model to generate the plurality of simulated driving scenarios increases accuracy of an output of the machine learning model.

In another possible implementation form of the first and second aspects, the machine learning model is further provided with a plurality of simulation parameters characteristic of at least one interesting driving scenario, and the machine learning model generates at least one of the plurality of simulated driving scenarios further according to the plurality of simulation parameters. Providing the machine learning model with a plurality of simulation parameters increases accuracy of an output of the machine learning model, and additionally increases a likelihood that a simulated driving scenario generated by the machine learning model comprises an interesting driving scenario. Optionally, the plurality of simulation parameters comprises a plurality of time-space-matrix distance values describing a plurality of distances, during an identified time interval, between a vehicle simulated by an autonomous driver and one or more objects of the plurality of input objects. Optionally, the plurality of time-space-matrix distance values are computed using captured driving data. Optionally, at least some of the captured driving data is captured by a plurality of sensors mounted on a vehicle while traversing a driving location. Optionally, the captured driving data is captured while executing another autonomous driving model. Optionally, the captured driving data comprises a plurality of digital image frames (frames). Optionally computing the plurality of time-space-matrix distance values comprises: computing a plurality of time-space matrices, each associated with one frame of the plurality of frames, and each comprising a set of time-space-matrix distance values each describing for a captured object of a plurality of captured objects identified in the frame a distance, identified in the frame, from another captured object of the plurality of captured objects; identifying in the plurality of time-space matrices at least one captured near collision between at least two captured objects of the plurality of captured objects, occurring at an identified time; and selecting from at least some of the time-space matrices at least some of the respective set of time-space-matrix distance values thereof related to the at least two captured objects at the identified time interval ending at the identified time to produce the plurality of time-space-matrix distance values. Optionally, computing the plurality of time-space-matrix distance values further comprises: computing at least one mutation of the plurality of time-space-matrix distance values. Optionally, computing the at least one mutation of the plurality of time-space-matrix distance values comprises executing at least one inference machine learning model. Optionally, computing the at least one mutation of the plurality of time-space-matrix distance values comprises incrementing or decrementing at least one of the plurality of time-space-matrix distance values. Using a plurality of simulation parameters computed using a plurality of time-space-matrix distance values computed from driving data captured while traversing a driving location and additionally or alternatively captured while executing an autonomous driving model increases a likelihood of an output of the machine learning model comprising at least one interesting driving scenario. In addition, computing one or more mutations of the plurality of time-space-matrix distance values increases a likelihood of generating more than one simulated driving scenario comprising an interesting driving scenario.

In an implementation form of the third aspect, the system further comprises using the autonomous driver model, after training, in at least one of: an autonomous driving system (ADS), and an advanced driver-assistance system (ADAS). Using the autonomous driver model trained as described above in an ADS and additionally or alternatively in an ADAS increases accuracy of an output of the ADS and additionally or alternatively of the ADAS thus increasing usability of the ADS and additionally or alternatively of the ADAS.

In another implementation form of the third aspect, training the other machine learning model comprises using a plurality of recorded data sets, each recorded while a vehicle traverses a physical scene and comprises a recorded driving scenario and a plurality of recorded driving commands, the training is according to a difference between the plurality of recorded driving commands and a plurality of computed driving commands computed by the other machine learning model in response to the recorded driving scenario.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

Figure 7:
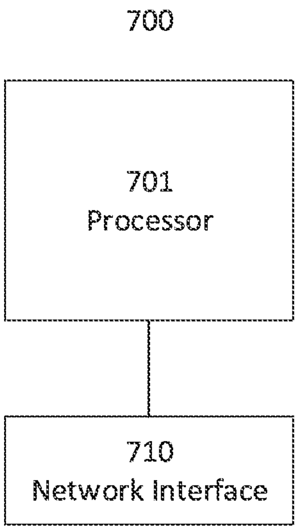
Figure 8:
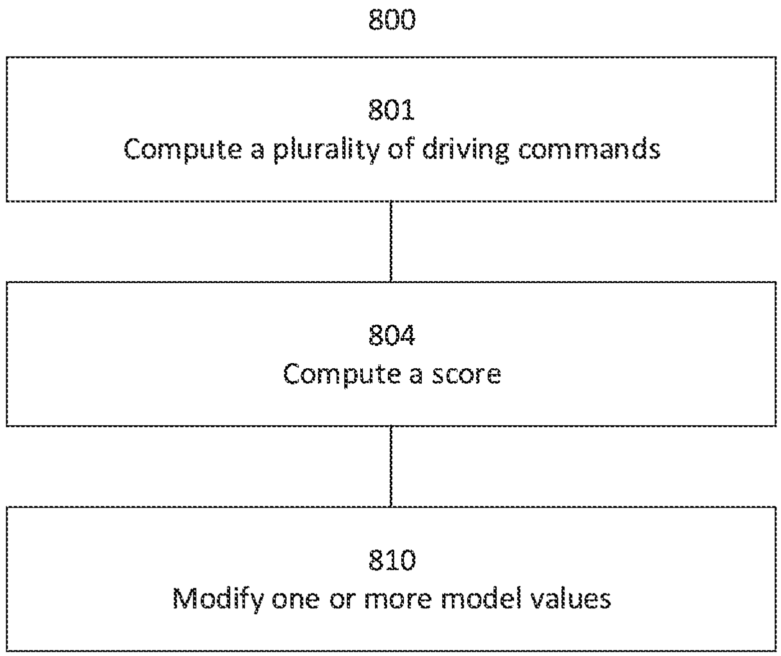

FIGS. 6B, 6C, 6D, and 6E are exemplary time-space-distance matrices, according to some embodiments;

FIG. 7 is a schematic block diagram of an exemplary system for training an autonomous driving model, according to some embodiments; and FIG. 8 is a flowchart schematically representing an optional flow of operations for training an autonomous driving model, according to some embodiments.

DESCRIPTION OF SPECIFIC EMBODIMENTS OF THE INVENTION

For simplicity, the following description focuses on generating simulated driving scenarios for the purpose of training a machine learning model for autonomous driving (an autonomous driving model). However, other embodiments include generating simulated driving scenarios for the purpose of testing the autonomous driving model, additionally, or alternatively validating the autonomous driving model, and additionally or alternatively verifying the autonomous driving model. Unless specifically noted, any description below pertaining to training an autonomous driving model should be read as additionally or alternatively pertaining to testing the autonomous driving model, additionally or alternatively pertaining to validating the autonomous driving model, and additionally or alternatively pertaining to verifying the autonomous driving model. In addition, in other embodiments of the systems and methods described below the simulated driving scenarios may be used for one or more systems that are not related to autonomous driving, for example a driving simulator system.

In machine learning, increasing an amount of datasets used to train a machine learning model typically increases accuracy of an output of the machine learning model. When capturing driving scenarios from real driving environments (henceforth referred to as real driving scenarios), most of the real driving scenarios are of likely scenarios, not edge-cases. As a result, a system trained by real driving scenarios is expected to become proficient in responding to the likely scenarios—of which there are many—but may perform poorly in response to an edge-case scenario, as the system was trained with relatively fewer data sets representing an edge-case.

Henceforth, the terms "edge-case" and "interesting scenario" are used interchangeably, both used to mean an unlikely but possible scenario.

One possible means of increasing an amount of interesting scenarios is increasing an amount of real driving scenarios. A cost of increasing the amount of real driving scenarios may be prohibitive, possibly requiring dozens of test vehicles on the road and additionally or alternatively taking many years to collect. In addition, increasing the amount of real driving scenario may not increase the amount of interesting scenarios sufficiently, for example in the summer it may not be possible to capture a heavy downpour of rain. Again, capturing sufficient driving scenarios may require an extended amount of time, spanning at least several months, and additionally or alternatively spanning many locations.

Another possible means of increasing the amount of interesting scenarios is by generating simulated interesting driving scenarios. Multiple simulated driving scenarios may be produced by using variations on static objects of a driving environment, dynamic objects of the driving environment, and environmental conditions, for example weather conditions and additionally or alternatively light conditions. There is an expectation that a large amount of simulated driving scenarios, generated using a large amount of variations, will include many interesting driving scenarios. However, there is no guarantee that a collection of generated simulated driving scenarios, whether generated randomly or according to a procedure, will provide sufficient coverage of possible interesting driving scenarios to guarantee that an autonomous driving model trained therewith will be robust.

As used henceforth, the term generating model is used to mean a machine learning model trained to generate a simulated driving scenario.

In machine learning, supervised learning refers to a category of learning algorithms where a machine learning model learns how to map an input to an output based on pairs of examples, each pair comprising an input and an expected output. Some methods for training a generating model use a plurality of input driving scenarios, each labeled with a classification indicative of whether the input driving scenario is interesting. To produce a robust generating model there is a need for a large amount of interesting input driving scenarios, such an amount being difficult to capture from real driving sessions, as discussed above.

Reinforcement learning is another category of machine learning methods, referring to goal-oriented learning algorithms, where a machine learning model learns how to attain a complex objective (goal) or how to maximize along a particular dimension over many steps, by penalizing the machine learning model when it makes a wrong decision and additionally or alternatively rewarding the machine learning model when it makes a right decision. In some reinforcement learning methods, when a machine learning model comprises a plurality of model values, in each of a plurality of training iterations one or more of the model values is modified according to a score, indicative of a reward and additionally or alternatively of a penalty, in order to increase a reward, and additionally or alternatively reduce a penalty, in a following training iteration.

Using some reinforcement learning methods to train a generating model requires scoring an output of the generating model while training. The present invention, in some embodiments thereof, proposes generating a plurality of simulated driving scenarios using a trained generating model, where training the generating model is by using another machine learning model trained to compute a classification indicative of a likelihood that a simulated driving scenario, provided to the other machine learning model, comprises one or more interesting driving scenarios. In such embodiments, in each of a plurality of training iterations, the other machine learning model is provided with one or more simulated driving scenarios produced by the generating model and the other machine learning model optionally computes a classification indicative of a likelihood the one or more simulated driving scenarios produced by the generating model comprise one or more interesting driving scenarios. Optionally, the classification is used as a score for reinforcement learning, i.e. one or more model values of the generating model are optionally modified according to the score to increase a likelihood of classifying another simulated driving scenario generated by the generating model in following training iteration as having one or more other interesting driving scenarios. Using another machine learning model trained to compute a classification indicative of a likelihood that a simulated driving scenario comprises an interesting driving scenario to train the generating model reduces cost of development of the generating model by facilitating use of one or more reinforcement learning methods to train the generating model, thus reducing an amount of real interesting driving scenarios required to train the generating model, compared for example to another amount of real interesting driving scenarios required when using one or more other learning methods to train the generating model.

In addition, in some embodiments, the present invention proposes training the other learning model using a plurality of recorded data sets, each recorded while a vehicle traverses a physical scene and comprises a recorded driving scenario and a plurality of recorded driving commands. An example of a driving command is a steering command. Another example of a driving command is an acceleration command. As described above, a trained autonomous driving model is expected to perform well in response to a likely driving scenario. Hence, when a trained autonomous driving model performs poorly in response to a driving scenario, there is an increased likelihood that the driving scenario is an interesting driving scenario which the trained autonomous driving model encounters infrequently.

Thus, training the other machine learning model to compute a classification in response to an input driving scenario optionally comprises training the other machine learning model to predict how well, or how poorly, a trained autonomous driving model will perform in response to the input driving scenario. Optionally, training the other machine learning model comprises using an imitation learning method, that is a method where a desired behavior is demonstrated, for example the recorded driving commands. Optionally, training the other learning model is according to a difference between the plurality of recorded driving commands and a plurality of computed driving commands computed by the other machine learning model in response to the recorded driving scenario. Optionally, the difference between the plurality of recorded driving commands and the plurality of computed driving commands is indicative of how well, or how poorly, the other machine learning model performed as an autonomous driving model in response to the recorded driving scenario. For example, a large difference between the plurality of recorded driving commands and the plurality of computed driving commands may be indicative of the other machine learning model performing poorly as an autonomous driving model. In such embodiments, when the other machine learning model performs poorly as an autonomous driving model in response to the recorded driving scenario, the recorded driving scenario may be assumed to comprise an interesting driving scenario, and thus the difference between the plurality of recorded driving commands and the plurality of computed driving commands is optionally used to train the other machine learning model to compute the classification of the recorded driving scenario. Optionally, the other machine learning model is trained to classify the recorded driving scenario as interesting when the difference between the plurality of recorded driving commands and the plurality of computed driving commands is indicative that the other machine learning model performed poorly as an autonomous driving model in response to the recorded driving scenario. Training the other machine learning model according to the difference between the plurality of recorded driving commands and the plurality of computed driving commands allows training the other machine learning model using a smaller amount of recorded interesting driving scenarios than used in some other methods, thus reduces cost of development of the other machine learning model while increasing accuracy of and output of the other machine learning model, thus increasing accuracy of the generating model trained using the other machine learning model.

Optionally, the generating model generates a plurality of simulated driving scenarios in response to a plurality of input driving objects. Optionally, the plurality of input driving objects comprises one or more moving objects of a simulated driving environment, for example a vehicle or a person. Optionally, the plurality of input driving objects comprises one or more static objects of the simulated driving environment, for example a building or a sidewalk. Optionally, one or more of the plurality of input driving objects are generated by a random object generator. Optionally, the generating model is further provided with a plurality of simulation parameters characteristic of one or more interesting driving scenarios. Optionally, the generating model generates at least one of the plurality of simulated driving scenarios according to the plurality of simulation parameters. Optionally, one or more of the plurality of simulation parameters is a mutation of one or more other of the plurality of simulation parameters. When the plurality of simulation parameters is characteristic of an interesting driving scenario, there is a greater likelihood of a mutation of one or more of the plurality of simulation parameters being characteristic of another interesting driving scenario, than a likelihood of a random simulation parameter being characteristic of another interesting driving scenario. A time-space-matrix is a matrix comprising a plurality of distance values, describing a plurality of distances during an identified time interval, between at least some pairs of objects selected from a plurality of objects. In a possible example, the plurality of simulation parameters comprises a plurality of time-space-matrix distance values describing a plurality of distances, during an identified time interval, between a vehicle simulated by an autonomous driver and one or more objects of the plurality of input driving objects, for example another vehicle. In this example, modifying one or more of the distance values increases a likelihood of the generating model generating another simulated driving scenario comprising another interesting driving scenario, compared to generating the other simulated driving scenario using random time-space-matrix distance values, thus increasing accuracy of an output of the generating model while reducing cost of operation of the generation model.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language, and scripting languages such as Phyton, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
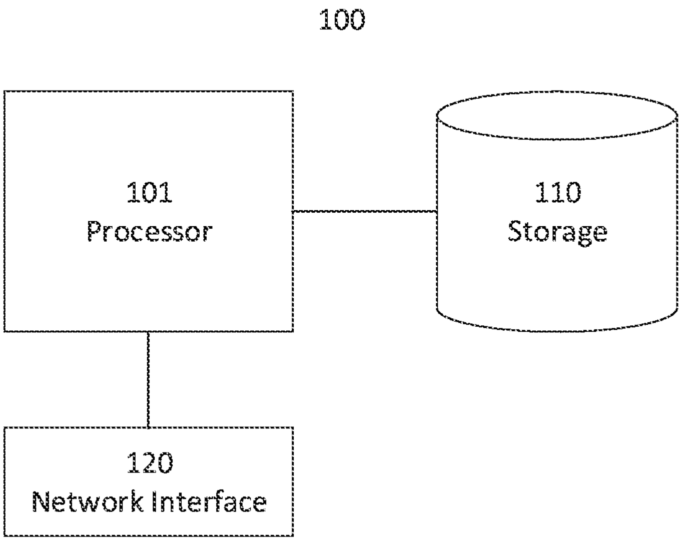
FIG. 1 is a schematic block diagram of an exemplary system for generating simulated driving scenarios, according to some embodiments.

Reference is now made to FIG. 1, showing a schematic block diagram of an exemplary system 100 for generating simulated driving scenarios, according to some embodiments. In such embodiments, at least one hardware processor 101 is connected to at least one digital storage 110, optionally for the purpose of storing one or more simulated driving scenarios generated by at least one hardware processor 101. Some examples of a digital storage are a hard disk drive, a network connected storage, and a random access memory.

For brevity, henceforth the term "processing unit" is used to mean "at least one hardware processor".

Optionally, processing unit 101 is connected to one or more digital communication network interface 120, optionally for the purpose of providing the one or more simulated driving scenarios to one or more other processing units. Optionally, one or more digital communication network interface 120 is connected to a Local Area Network (LAN), for example an Ethernet network or a Wi-Fi network. Optionally, one or more digital communication network interface 120 is connected to a Wide Area Network (WAN), for example the Internet or a cellular network, for example a Global System for Mobile communication (GAM) network.

To produce one or more simulated driving scenarios, in some embodiments system 100 implements the following optional method.

Figure 2:
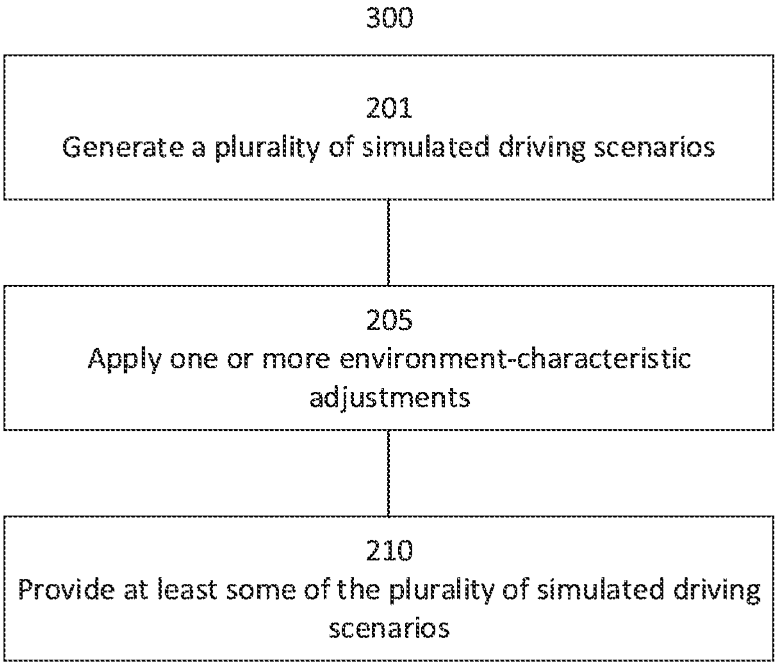
FIG. 2 is a flowchart schematically representing an optional flow of operations for generating simulated driving scenarios, according to some embodiments.

Reference is now made also to FIG. 2, showing a flowchart schematically representing an optional flow of operations 200 for generating simulated driving scenarios, according to some embodiments. In such embodiments, in 201, processing unit 101 generates a plurality of simulated driving scenarios.

Figure 3A:
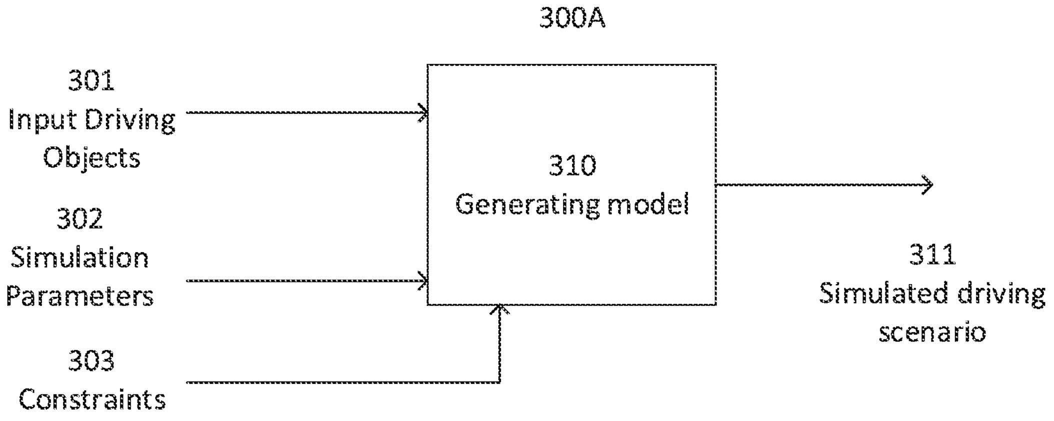
FIG. 3A is a schematic block diagram of an exemplary flow of data, according to some embodiments.

Reference is now made also to FIG. 3A, showing a schematic block diagram of an exemplary flow of data 300A, according to some embodiments. Optionally, processing unit 101 executes machine learning model 310, henceforth referred to as generating model 310. Optionally, generating model 310 is a generator network of a Generative Adversarial Neural Network (GAN). Optionally, generation model 310 is a generator network of a Conditional Generative Adversarial Neural Network (cGAN). Optionally, each of plurality of simulated driving scenarios 311 is generated by generating model 310. Optionally, to generate each of the plurality of simulated driving scenarios 311, henceforth referred to as simulated driving scenario 311, processing unit 101 provides generating model 310 with a plurality of input driving objects 301. Optionally, plurality of input driving objects 301 comprises a moving object of a simulated driving environment. Some examples of a moving object are a vehicle, for example a car and a truck. Another example of a moving object is a vulnerable road user, for example a pedestrian, i.e. a person, an animal, and a bicycle ridden by a person. Optionally, a moving object is an object moving in the air, for example a bird, a rock, and a piece of paper. Optionally, plurality of input driving objects 301 comprises a static object of a simulated driving environment. Some examples of a static object are a sidewalk, a curb, a traffic sign, a billboard, an obstacle, a mountain wall, a ditch, a post such as a lamp post, a rail, a fence, a building, a tree, a wall, and a road mark. Optionally, one or more of plurality of input driving objects 301 are generated by a random object generator. Optionally, one or more other of plurality of input driving objects 301 are extracted from real driving data captured by one or more sensors mounted on a vehicle while the vehicle traverses a physical scene.

Optionally, generating model 310 is further provided with a map describing a topography of a simulated driving environment. Optionally, generating model 310 is further provided with plurality of constraints 303, constraining a plurality of physical properties of the plurality of input driving objects, for example consistency of the plurality of input driving objects with the map. One possible example of a constraint constrains a sidewalk to be at ground level. Another possible example of a constraint constrains a sign post to not float in the air. Optionally, at least some of plurality of constraints 303 constrain physical properties of a behavior of one or more of the plurality of input driving objects. For example, a constraint may constrain a velocity of a pedestrian, prohibit a vehicle from moving on a sidewalk, and additionally or alternatively prohibit a vehicle from maneuvering in a manner not supported by an operation design domain thereof, some examples being constraining an acceleration value of the vehicle and constraining a steering value of the vehicle.

Optionally, one or more of plurality of simulated driving scenarios 311 comprises a plurality of movement vectors of a plurality of simulated objects of a simulated driving environment. Optionally, one or more subsets of the plurality of movement vectors each describe a movement path of a simulated object of the plurality of simulated objects. Optionally, at least some of the plurality of simulated objects are simulated according to plurality of input driving objects 301.

Figure 3B:
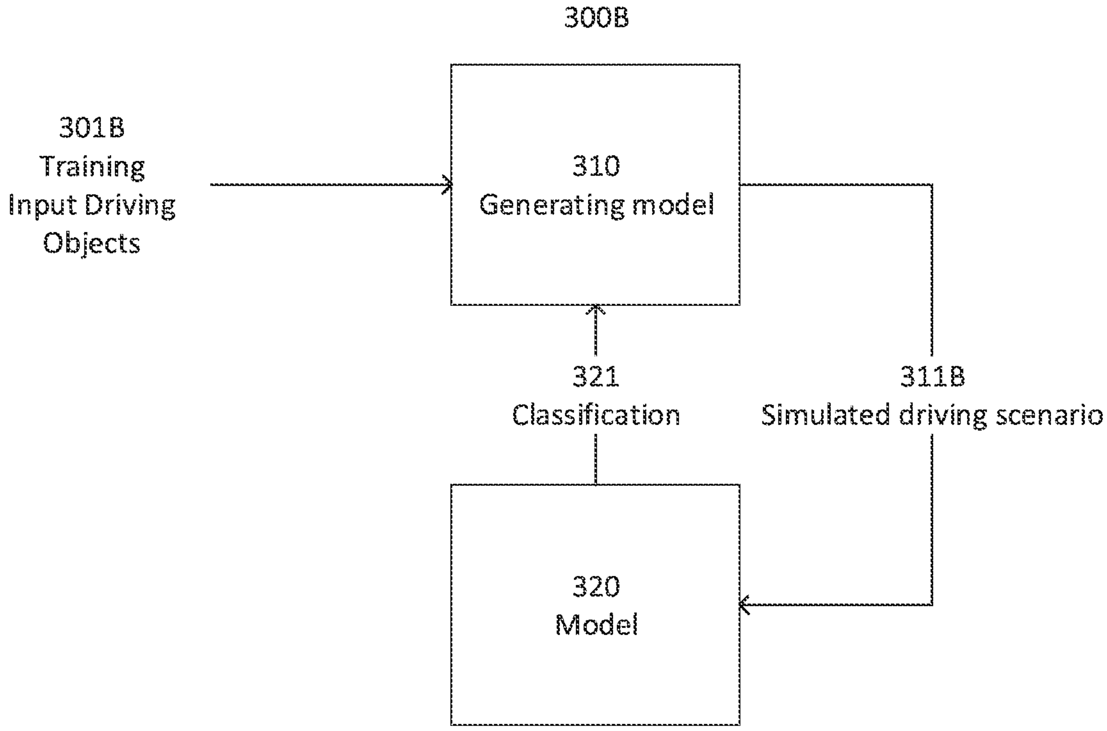
FIG. 3B is a schematic block diagram of an exemplary flow of data for training a generating model, according to some embodiments.

Optionally, generating model 310 is trained using another machine learning model. Reference is now made also to FIG. 3B, showing a schematic block diagram of an exemplary flow of data 300B for training a generating model, according to some embodiments. Optionally, generating model 310 is trained using a plurality of training input driving objects 301B. Optionally, generating model 310 is trained using other machine learning model 320. Optionally, other machine learning model 320 is a neural network.

Optionally, other machine learning model 320 is trained to compute one or more classification 321 indicative of a likelihood that one or more simulated driving scenarios 311B produced by generating model 310, optionally while training generating model 310, comprise one or more interesting driving environments.

Figure 3C:
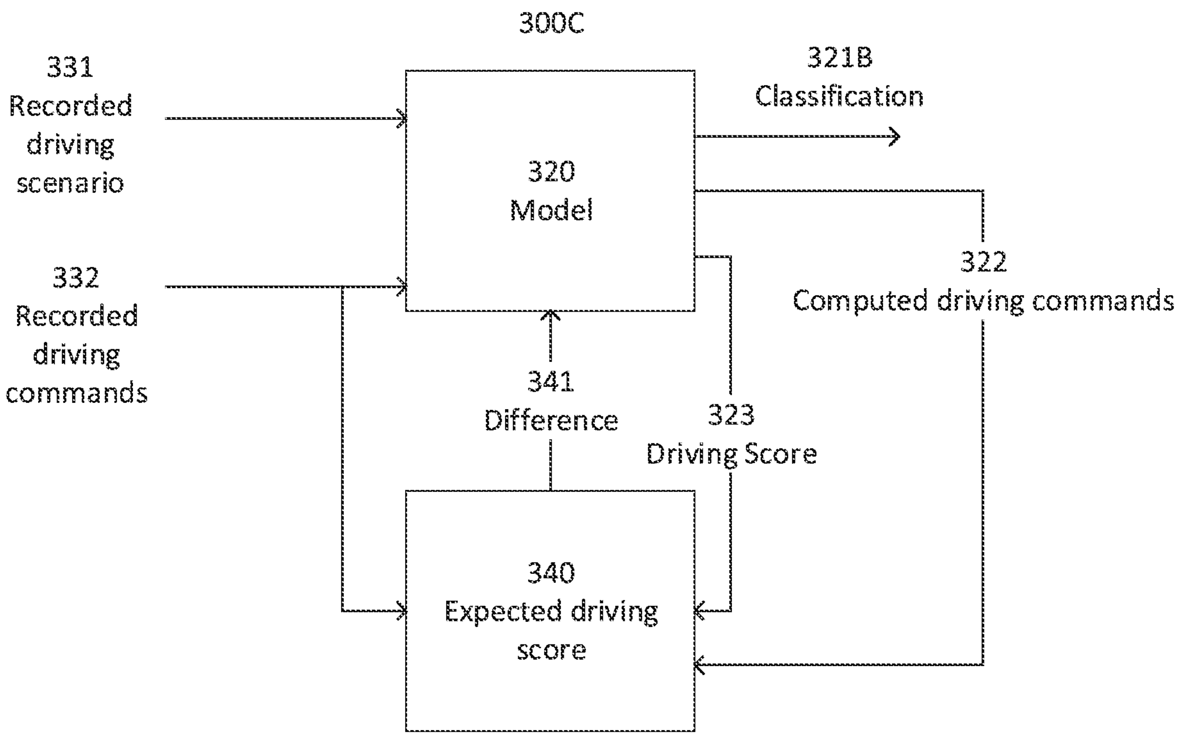
FIG. 3C is a schematic block diagram of an exemplary flow of data for training another model, according to some embodiments.

Optionally, other machine learning model 320 is trained using a plurality of recorded data sets, each recorded while a vehicle traverses a physical scene. Reference is now made also to FIG. 3C, showing a schematic block diagram of an exemplary flow of data 300C for training another machine learning model, according to some embodiments. Optionally, each of the plurality recorded data sets comprises a recorded driving scenario 331 and a plurality of recorded driving commands 332. Optionally, other machine learning model 320 computes classification 321B, indicative of a likelihood that recorded driving scenario 331 includes an interesting driving scenario. Optionally, other machine learning model 320 computes a plurality of computed driving commands 322 simulating a vehicle behavior, in response to recorded driving scenario 331. Optionally, other machine learning model 320 computes driving score 323, predicting a difference between plurality of computed driving commands 322 and plurality of recorded driving commands 332. Optionally, 340 is an expected driving score computed according to a difference between plurality of computed driving commands 322 and plurality of recorded driving commands 332. Optionally, 341 is a difference between computed driving score 323 and expected driving score 340. Optionally, machine learning model 320 is trained using an imitation learning method. Optionally, other machine learning model 320 is trained according to difference 341, optionally such that a large difference 341, for example when difference 341 is a difference value exceeding a threshold difference value, causes other machine learning model 320 to be modified to increase a likelihood of other machine model 320 classifying recorded driving scenario 331 as interesting.

Optionally, generating model 310 is trained by system 100, optionally further implementing the following method.

Figure 4:
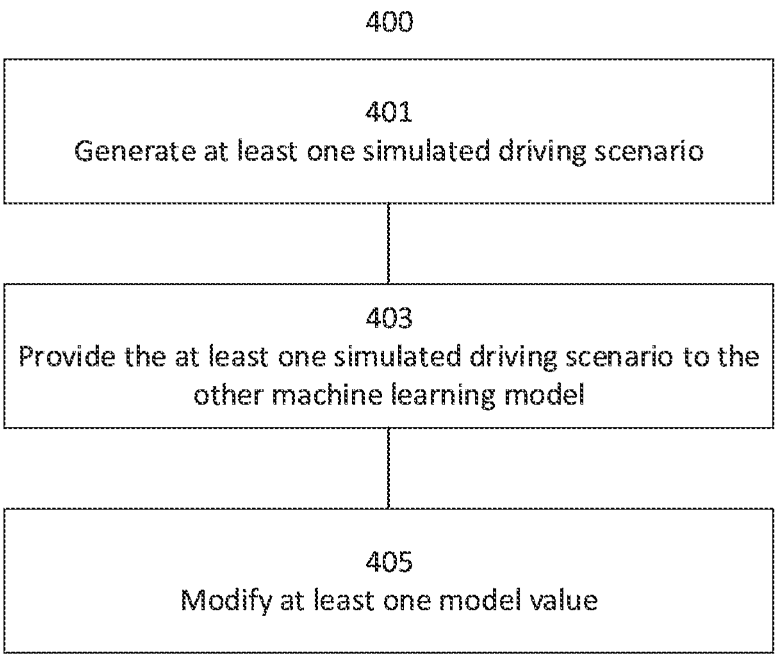
FIG. 4 is a flowchart schematically representing an optional flow of operations for training a generating model, according to some embodiments.

Reference is now made also to FIG. 4, showing a flowchart schematically representing an optional flow of operations 400 for training a generating model, according to some embodiments. In such embodiments, in each of a plurality of training iterations, in 401 processing unit 101 generates by generating model 310 one or more simulated driving scenarios 311B, in response to plurality of training input driving objects 301B. Optionally, generating model 310 produces one or more simulated driving scenarios additionally or alternatively according to one or more of: a plurality of training constraints, a training map, and a plurality of training simulation parameters, characteristic of one or more interesting driving scenario. Optionally, in 403 processing unit 101 provides one or more simulated driving scenarios 311 to other machine learning model 320, optionally to compute one or more classification 321. Optionally, one or more classification is indicative of a likelihood that one or more simulated driving scenarios 311B comprise one or more interesting driving scenarios.

An interesting driving scenario may be characterized by one or more characteristics. Some examples of a characteristic of an interesting driving scenario are an object's velocity, an object's acceleration or deceleration, and object's orientation, a driving command such as sharp steering, and an object being close to another object, whether the other object is moving or is static. Optionally, an interesting driving scenario comprises a velocity value of a vehicle simulated by other machine learning model 320. Optionally, the velocity value exceeds a threshold value. Optionally, an interesting driving scenario comprises an acceleration value of the vehicle. For example, an acceleration value may be indicative of the vehicle suddenly stopping, or suddenly accelerating. Optionally, an interesting driving scenario comprises a driving command generated by other machine learning model 320. For example, the driving command may be a steering command, for example a command to steer at an angle compared to an original direction of movement. Optionally, an interesting driving scenario comprises an orientation value of the vehicle, for example when the vehicle turns. Optionally, an interesting driving scenario comprises a distance between the vehicle and one or more other objects of the driving scenario, for example a distance from another vehicle, a distance from a sidewalk, or a distance from a pedestrian. Optionally, an interesting driving scenario comprises a change in a distance between the vehicle and the one or more other objects of the driving scenario.

In 405, processing unit 101 optionally modifies one or more model values of generation model 310 according to one or more classification 321. Optionally, processing unit 101 modifies the one or more model values of generation model 310 to increase a likelihood of classifying another simulated driving scenario generated in a following training iteration of the plurality of training iterations as having one or more other interesting driving scenarios.

Reference is now made again to FIG. 3A. Optionally, generating model 310 is provided, optionally by processing unit 101, with a plurality of simulation parameters 302. Optionally, the plurality of simulation parameters is characteristic of one or more interesting driving scenarios. Optionally, generating model 310 generates one or more of plurality of simulated driving scenarios 311 further according to plurality of simulation parameters 302.

Optionally, plurality of simulation parameters 302 comprises a plurality of time-space-matrix distance values describing a plurality of distances, during an identified time interval, between a vehicle simulated by an autonomous driver and one or more objects of the plurality of input driving objects. Optionally, at least some of the one or more objects are identified in the map provided to generating model 310, for example a road edge. Optionally, the one or more of plurality of simulated driving scenarios 311 preserve at least some of the plurality of time-space-matrix distance values. Optionally, the plurality of time-space-matrix distance values describe behavior of the one or more objects of the plurality of input driving objects. For example, a scenario where another vehicle in front of the vehicle simulated by the autonomous driver stops or veers. In another example, the plurality of time-space-matrix distance values describe a distance between two other vehicles in front on the vehicle simulated by the autonomous driver. Some of the time-space-matrix distance values may reflect acceleration of the one or more objects. Some of the time-space-matrix distance values may reflect velocity of the one or more objects. Some of the time-space-matrix distance values may reflect orientation of the one or more objects. Some of the time-space-matrix distance values may reflect position of the one or more objects. Optionally, a sequence of some of the time-space-matrix distance values describes an interesting driving scenario. Optionally, the plurality of time-space-matrix distance values are computed using captured driving data. Optionally, at least some of the captured driving data is captured by a plurality of sensors mounted on a vehicle while traversing a driving location. Optionally, the captured driving data is captured while executing another autonomous driving model.

Optionally, the captured driving data comprises a plurality of digital image frames (frames). Optionally processing unit 101 executes the following method to compute the plurality of time-space-matrix distance values.

Figure 5:
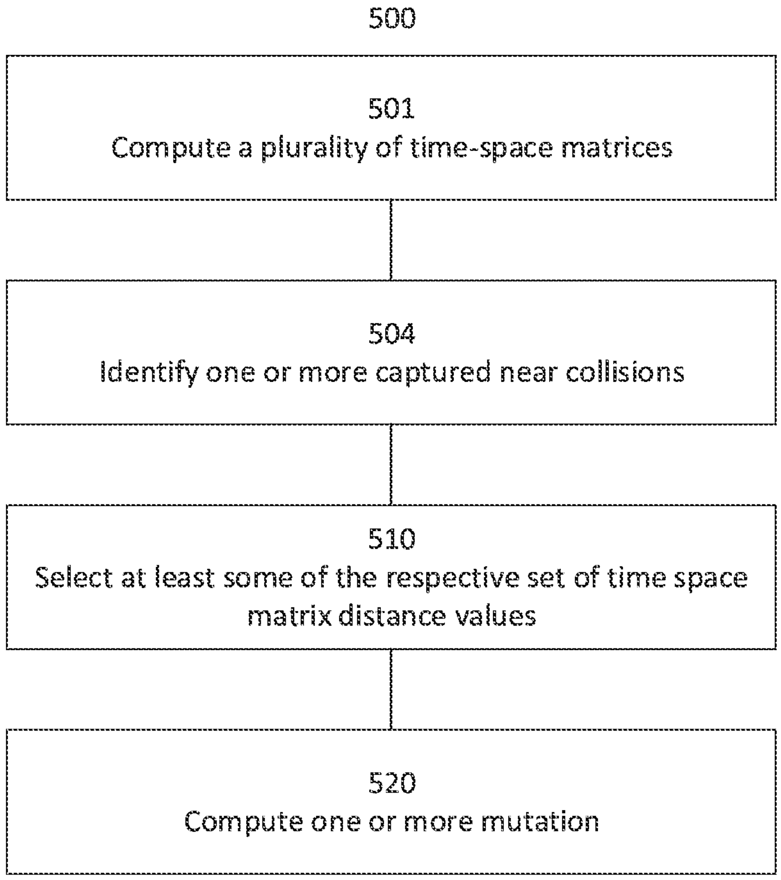
FIG. 5 is a flowchart schematically representing an optional flow of operations for computing a plurality of time-space-matrix distance values, according to some embodiments.

Reference is now made also to FIG. 5, showing a flowchart schematically representing an optional flow of operations 500 for computing a plurality of time-space-matrix distance values, according to some embodiments. In such embodiments, in 501 processing unit 101 optionally computes a plurality of time-space matrices. Optionally, each of the plurality of time-space matrices is associated with one frame of the plurality of frames, and comprises a set of time-space-matrix distance values. Optionally, each of the set of time-space-matrix distance values describes, for a captured object of a plurality of captured objects identified in the frame, a distance identified in the frame of the captured object from another captured object of the plurality of captured objects.

Figure 6A:
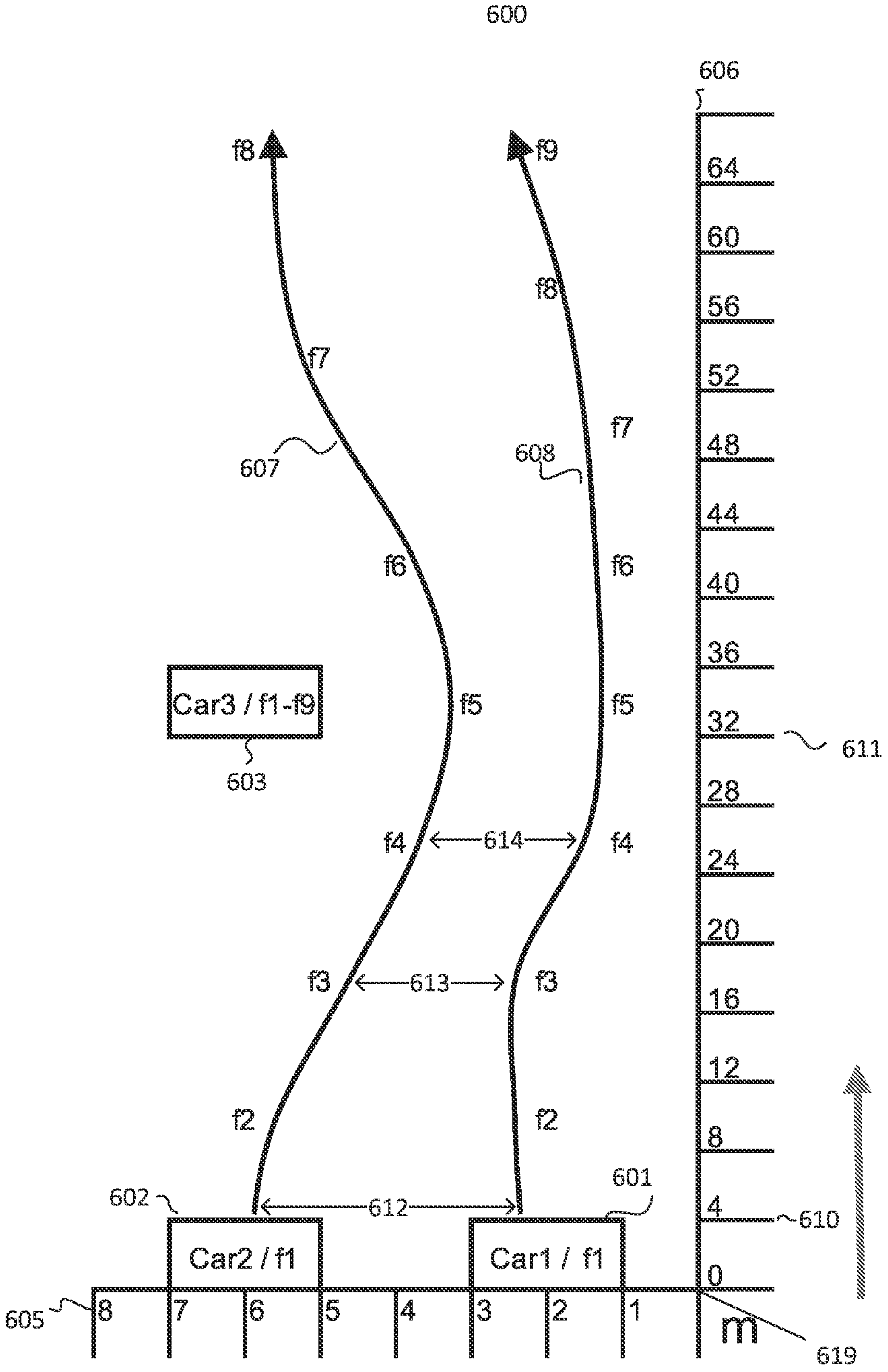
FIG. 6A is a schematic block diagram of an exemplary part of a driving scenario, according to some embodiments.
Figure 6B:
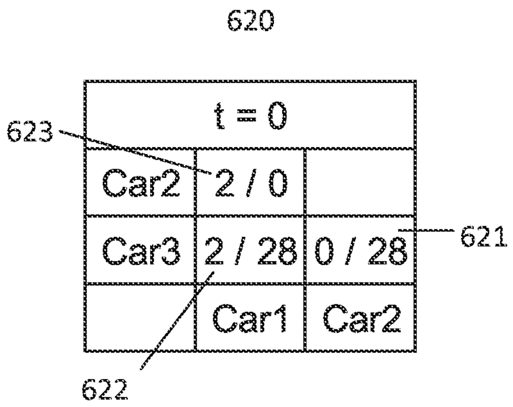

To help explain how a time-space matrix is associated with a frame of the plurality of frames, reference is now made also to FIG. 6A, showing a schematic block diagram of an exemplary part of a driving scenario 600, according to some embodiments, and to FIGS. 6B, 6C 6D, and 6E showing exemplary time-space matrices 620, 630, 640 and 650 respectively, computed for exemplary part of driving scenario 600, according to some embodiments. For brevity, henceforth exemplary part of driving scenario 600 is referred to as "scenario 600". It should be noted that scenario 600 is a non-limiting exemplary scenario, described to demonstrate an association between driving data comprising a plurality of frames and a plurality of time-space matrices. There exist other scenarios that are different from the example described herewithin.

In this example, scenario 600 comprises three vehicles, car 1 601, car 2 602 and car 3 603. In this example car 3 603 is stationary and does not move throughout the scenario. In this example, lateral axis 605 denotes a lateral axis of movement of one or more vehicles in scenario 600 and longitudinal axis 606 denotes a longitudinal axis of movement of the one or more vehicles in scenario 600. Distances on axis 605 and axis 606 are measured in this example in meters, starting from origin 619.

In this example, car 1 601 moves in scenario 600 following path 608 and car 2 602 moves in scenario 600 following path 607. As can be seen, in this example car 2 602 moving along path 607 veers to the right, possibly to avoid car 3 603, followed by car 1 601 veering to the right along path 608, possibly to avoid car 2 602. It should be noted that path 607 and path 608 each denote a path of an approximate center of the respective vehicle; a lateral distance between the vehicles as described below is measured between sides of the vehicles and is less than a distance between the approximate centers.

Optionally, the captured driving data comprises a plurality of frames including frame 1 captured at a time denoted by t=0, frame 3 captured at another time denoted by t=2, frame 4 captured at further another time denoted by t=3, and frame 5 captured at an additional other time denoted by t=4.

In this example, in frame 1 both a front end of car 1 601 and a front end of car 2 602 are identified at longitudinal distance 610 of 4 meters from origin 619. In addition, distance 612 denotes a distance captured in frame 1 between an approximate center of car 2 602 and another approximate center of car 1 601, corresponding to another lateral distance of 2 meters between a right side of car 2 602 and a left side of car 1 601 Matrix 620 in FIG. 6B comprises a plurality of distance values describing a plurality of distances between objects identified in frame 1. Cell 623 of matrix 620 shows a lateral distance of 2 meters between car 1 601 and car 2 602 and a longitudinal distance of 0 meters therebetween. Similarly, a back of car 3 603, identified at longitudinal distance 611 of 32 meters, is 28 meters in front of both car 1 601 and car 2 602 along longitudinal axis 606. In this example, in frame 1 car 1 601 is 2 meters to the left of car 3 603, and car 2 602 is exactly behind car 3 603. Cells 621 and 622 of matrix 620 show these distances.

Figure 6C:
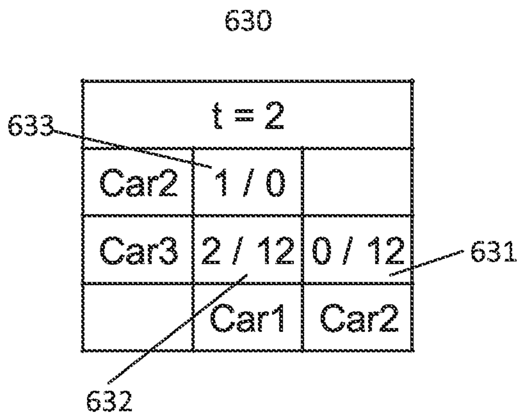

Matrix 630 in FIG. 6C comprises another plurality of distance values describing a plurality of distances between objects identified in frame 3. As car 1 601 and car 2 602 move forward along paths 608 and 607 respectively, their respective longitudinal distances from car 3 603 are reduced to 12 meters. This reduced longitudinal distance is shown in cell 631 and cell 632 of matrix 630. As car 2 602 veers to the right, lateral distance 613, denoting a distance captured in frame 3 between the approximate center of car 2 602 and the other approximate center of car 1 601, corresponds to another lateral distance between the right side of car 2 602 and the left side of car 1 601 being reduced to 1 meter compared to lateral distance 612 captured in frame 1. This reduced other lateral distance is shown in cell 633.

Figure 6D:
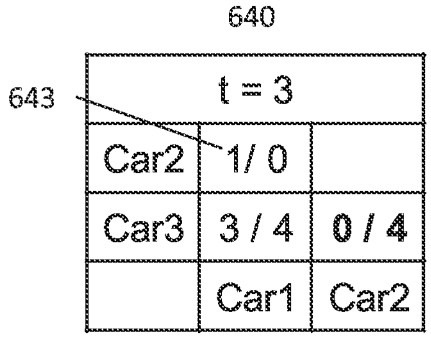

Matrix 640 in FIG. 6D comprises an additional plurality of distance values describing a plurality of distances between objects identified in frame 4. As car 1 601 veers to the right, possibly in response to car 2 602 veering to the right, and as car 2 602 continues moving to the right, the lateral distance between car 1 601 and car 2 601 captured in frame 4 does not change compared to lateral distance 613 captured in frame 3. Cell 643 in matrix 640 shows that the other lateral distance between the right side of car 2 602 and the left side of car 1 601 remains 1 meter.

Figure 6E:
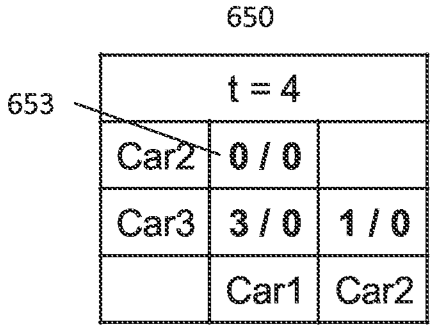

Matrix 650 in FIG. 6E comprises another additional plurality of distance values describing a plurality of distances between objects identified in frame 5. In this example car 1 601 does not move further right. This may be, for example, because there is a curb to the right of car 1 601. As car 2 602 continues veering to the right, possibly to avoid car 3 603, lateral distance 614, denoting a distance captured in frame 5 between the approximate center of car 2 602 and the other approximate center of car 1 601, corresponds to the other lateral distance between the right side of car 2 602 and the left side of car 1 601 being between car 1 601 and car 2 602 being further reduced to almost 0 meters. Cell 653 in matrix 650 shows the other lateral distance between the two vehicles reduced to 0 meters.

Reference made again to FIG. 6A, note that in frame 6, denoted by f6, after passing car 3 603, car 2 602 veers back to left and accelerates as may be seen by a position of car 2 602 in frame 7, denoted by f7. In addition, car 2 602 returns to an approximate original lateral position thereof at around frame 8, denoted by f8; car 1 601, respectively and with a time delay following the movement of car 2 602, also veers to another approximate original lateral position thereof.

Sequence of values cell 623, cell 633, cell 643, and cell 653 may be indicative of a near collision condition between car 1 601 and car 2 602, reaching its peak in frame 5.

In other examples, a time-space matrix may comprise one or more distance values of one or more vehicles from one or more other objects, for example from a curb or an edge of a road. Reference is now made again to FIG. 5. In 504, processing unit 101 optionally identifies in the plurality of time-space matrices, one or more captured near collisions between two of more captured objects of the plurality of captured objected, occurring at an identified time. Optionally, the one or more captured near collisions are identified in the plurality of time-space matrices by one or more additional machine learning models. Scenario characteristics in the identified amount of time before the identified time of the one or more captured near collisions may be characteristic of an interesting driving scenario. Thus, in 510 processing unit 101 optionally selects from at least some of the time-space matrices at least some of the respective set of time-space-matrix distance values thereof, where the selected time-space-matrix distance values are related to the two or more captured objects at the identified time interval ending at the identified time. Optionally, the at least some of the respective set of time-space-matrix values are selected from the at least some of the time-space-matrices by one or more other additional machine learning models. Optionally, in 520 processing unit 101 optionally computes one or more mutations of the plurality of time-space-matrix distance values. Optionally, processing unit 101 executes one or more inference machine learning models to compute the one or more mutations. Optionally, processing unit computes at least some of the one or more mutations using generating model 310. Optionally, processing unit 101 computes at least one of the one or more mutations by incrementing or decrementing one or more of the plurality of time-space-matrix distance values.

Changing a distance value changes a distance vector between two objects, i.e. velocity and direction of one or more of the two objects. Thus, optionally the one or more mutations are translated into one or more driving commands of one or more of the two or more captured objects.

Reference is now made again to FIG. 2. In 205, processing unit 101 optionally applies one or more environment-characteristic adjustments to one or more of plurality of generated scenarios 311. Some example of an environment characteristic are: a weather condition, for example rain, wind, or clouds, an amount of light, and an angle of sun light, for example according to a time of day and additionally or alternatively according to a time of year. In 210, processing unit 101 optionally provides at least some of plurality of simulated driving scenarios 311 to one or more autonomous driving model. Optionally, processing unit 101 provides the at least some of plurality of simulated driving scenarios 311 via one or more digital communication network interface 120. Optionally, processing unit 101 stores the at least some of plurality of simulated driving scenarios 311 on one or more storage 110. Optionally, processing unit 101 provides the at least some of plurality of simulated driving scenarios 311 for one or more purposes selected from a group of purposes comprising: training the one or more autonomous driving model, testing the one or more autonomous driving model, verifying the one or more autonomous driving models, and validating the one or more autonomous driving model. Optionally, the one or more autonomous driving model is at least part of an ADAS. Optionally, the one or more autonomous driving model is at least part of an ADS.

Some embodiments comprise a system for training an autonomous driving model.

Reference is now made also to FIG. 7, showing a schematic block diagram of an exemplary system 700 for training an autonomous driving model, according to some embodiments. In such embodiments, processing unit 701 is connected to one or more digital communication network interface 710, optionally for the purpose of receiving one or more simulated driving scenarios. Optionally, one or more digital communication network interface 710 is connected to a Local Area Network (LAN), for example an Ethernet network or a Wi-Fi network. Optionally, one or more digital communication network interface 710 is connected to a Wide Area Network (WAN), for example the Internet or a cellular network, for example a Global System for Mobile communication (GAM) network. Optionally, processing unit 701 retrieves the one or more simulated driving scenarios from a storage connected thereto.

To train an autonomous driving model, system 700 optionally implements the following method.

Reference is now made also to FIG. 8, showing a flowchart schematically representing an optional flow of operations 800 for training an autonomous driving model, according to some embodiments. In such embodiments, in each of a plurality of iterations, in 801 processing unit 701 computes a plurality of driving commands by providing the autonomous driving model with one or more simulated driving scenarios. Optionally, the one or more simulated driving scenarios are generated by system 100, optionally implementing method 200. In 804, processing unit 701 optionally computes a score according to the plurality of driving commands and the one or more simulated driving scenarios. In 810, processing unit 701 optionally modifies one or more driving model values of the autonomous driving model to increase another score, computed in a following iteration of the plurality of iterations.

Optionally, after training, the autonomous driving model is used in an ADS. Optionally, after training, the autonomous driving model is used in an ADAS.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant input driving objects and simulation parameters will be developed and the scope of the terms "input driving objects" and "simulation parameters" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting. In addition, any priority document(s) of this application is/are hereby incorporated herein by reference in its/their entirety.

What is claimed is:

1. A system for generating simulated driving scenarios, comprising at least one hardware processor adapted for:

generating a plurality of simulated driving scenarios, each generated by providing a plurality of input driving objects to a machine learning model, where the machine learning model is trained using another machine learning model, trained to compute a classification indicative of a likelihood that a simulated driving scenario produced by the machine learning model comprises an interesting driving scenario;

wherein training the other machine learning model comprises using a plurality of recorded data sets, each recorded while a vehicle traverses a physical scene and comprises a recorded driving scenario and a plurality of recorded driving commands, the training is according to a difference between the plurality of recorded driving commands and a plurality of computed driving commands computed by the other machine learning model in response to the recorded driving scenario.

2. The system of claim 1, wherein the other machine learning model is a neural network; wherein the neural network is trained using an imitation learning method.

3. The system of claim 1, wherein the at least one hardware processor is further adapted for providing at least some of the plurality of simulated driving scenarios to at least one autonomous driving model for the purpose of at least one of: training the at least one autonomous driving model, testing the at least one autonomous driving model, verifying the at least one autonomous driving model, and validating the at least one autonomous driving model.

4. The system of claim 3, wherein the at least one autonomous driving system is at least part of a system selected from a group consisting of: an autonomous driving system (ADS), and an advanced driver-assistance system (ADAS).

5. The system of claim 1, wherein the machine learning model is trained using the other machine learning model by in each of a plurality of training iterations:

generating, by the machine learning model, at least one simulated driving scenario in response to a plurality of training input driving objects;

providing the at least one simulated driving scenario to the other machine learning model to compute at least one classification, indicative of a likelihood the at least one simulated driving scenario comprises at least one interesting driving scenario; and modifying at least one model value of the machine learning model, according to the at least one classification, to increase a likelihood of classifying another simulated driving scenario generated in a following training iteration as having at least one other interesting driving scenario.

6. The system of claim 5, wherein the at least one interesting driving scenario comprises at least one of: a velocity value of a vehicle simulated by the other machine learning model, an acceleration value of the vehicle simulated by the other machine learning model, a driving command generated by the other machine learning model, an orientation value of the vehicle simulated by the other machine learning model, and a distance between the vehicle simulated by the other machine learning model and at least one other object of the driving scenario.

7. The system of claim 1, wherein the plurality of input driving objects comprises at least one of: a moving object of a simulated driving environment, and a static object of a simulated driving environment and wherein the moving object is selected from a group of moving objects consisting of: a vehicle, and a person.

8. The system of claim 1, wherein the machine learning model is further provided with a plurality of simulation parameters characteristic of at least one interesting driving scenario; and wherein the machine learning model generates at least one of the plurality of simulated driving scenarios further according to the plurality of simulation parameters.

9. The system of claim 1, wherein for generating at least one of the plurality of simulated driving scenarios the machine learning model is further provided with a map describing a topography of a simulated driving environment.

10. The system of claim 1, wherein the plurality of input driving objects comprises at least one object generated by a random object generator.

11. The system of claim 1, wherein the machine learning model is further provided with a plurality of constraints; and wherein the machine learning model generates at least one of the plurality of simulated driving scenarios according to the plurality of constraints.

12. The system of claim 1, wherein at least one of the plurality of simulated driving scenarios comprises a plurality of movement vectors of a plurality of simulated objects of a simulated driving environment.

13. The system of claim 1, wherein generating at least one generated scenario of the plurality of simulated driving scenarios further comprises applying at least one environment-characteristic adjustment to the at least one generated scenario.

14. The system of claim 1, wherein the machine learning model is a generator network of a Generative Adversarial Neural Network (GAN) or of a Conditional Generative Adversarial Neural Network (cGAN).

15. A system for generating simulated driving scenarios, comprising at least one hardware processor adapted for:

generating a plurality of simulated driving scenarios, each generated by providing a plurality of input driving objects to a machine learning model, where the machine learning model is trained using another machine learning model, trained to compute a classification indicative of a likelihood that a simulated driving scenario produced by the machine learning model comprises an interesting driving scenario;

wherein the machine learning model is further provided with a plurality of simulation parameters characteristic of at least one interesting driving scenario; and wherein the machine learning model generates at least one of the plurality of simulated driving scenarios further according to the plurality of simulation parameters;

wherein the plurality of simulation parameters comprises a plurality of time-space-matrix distance values describing a plurality of distances, during an identified time interval, between a vehicle simulated by an autonomous driver and one or more objects of the plurality of input objects; wherein the plurality of time-space-matrix distance values are computed using captured driving data.

16. The system of claim 15, wherein at least some of the captured driving data is at least one of: captured by a plurality of sensors mounted on a vehicle while traversing a driving location and captured while executing another autonomous driving model.

17. The system of claim 15, wherein the captured driving data comprises a plurality of digital image frames (frames); and wherein computing the plurality of time-space-matrix distance values comprises:

computing a plurality of time-space matrices, each associated with one frame of the plurality of frames, and each comprising a set of time-space-matrix distance values each describing for a captured object of a plurality of captured objects identified in the frame a distance, identified in the frame, from another captured object of the plurality of captured objects;

identifying in the plurality of time-space matrices at least one captured near collision between at least two captured objects of the plurality of captured objects, occurring at an identified time; and selecting from at least some of the time-space matrices at least some of the respective set of time-space-matrix distance values thereof related to the at least two captured objects at the identified time interval ending at the identified time to produce the plurality of time-space-matrix distance values.

18. The system of claim 17, wherein computing the plurality of time-space-matrix distance values further comprises:

computing at least one mutation of the plurality of time-space-matrix distance values;

wherein computing the at least one mutation of the plurality of time-space-matrix distance values comprises at least one of executing at least one inference machine learning model and incrementing or decrementing at least one of the plurality of time-space-matrix distance values.

19. A method for generating simulated driving scenarios, comprising:

generating a plurality of simulated driving scenarios, each generated by providing a plurality of input driving objects to a machine learning model, where the machine learning model is trained using another machine learning model, trained to compute a classification indicative of a likelihood that a simulated driving scenario produced by the machine learning model comprises an interesting driving scenario;

wherein training the other machine learning model comprises using a plurality of recorded data sets, each recorded while a vehicle traverses a physical scene and comprises a recorded driving scenario and a plurality of recorded driving commands, the training is according to a difference between the plurality of recorded driving commands and a plurality of computed driving commands computed by the other machine learning model in response to the recorded driving scenario.

* * * * *